H. M. Handy
Bolt Cutter
No. 63721  Patented Apr. 9, 1867
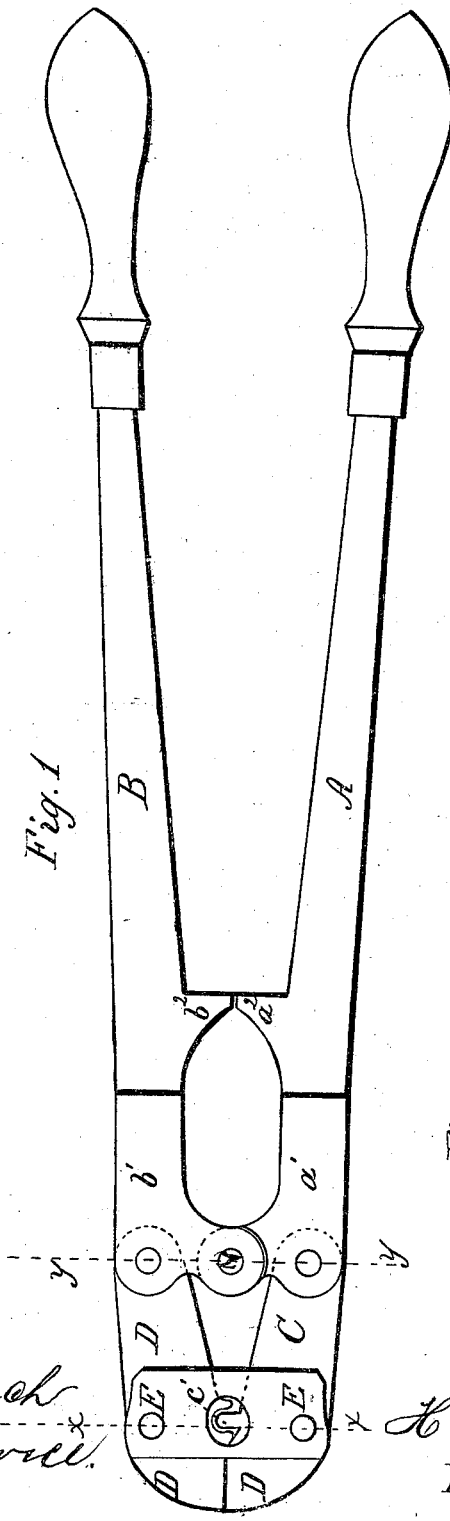

United States Patent Office.

HOMER M. HANDY, OF NILES, MICHIGAN.

Letters Patent No. 63,721, dated April 9, 1867.

---

IMPROVED BOLT-CUTTER.

---

The Schedule referred to in these Letters Patent and making part of the same.

---

TO ALL WHOM IT MAY CONCERN:

Be it known that I, HOMER M. HANDY, of Niles, in the county of Berrien, and State of Michigan, have invented a new and improved Bolt-Cutter; and I do hereby declare that the following is a full, clear, and exact description thereof, which will enable others skilled in the art to make and use the same, reference being had to the accompanying drawings, forming part of this specification, in which—

Figure 1 is a side view of my improved bolt-cutter.

Figure 2 is a detail sectional view of the same, taken through the line $x\,x$, fig. 1.

Figure 3 is a detail sectional view of the same, taken through the line $y\,y$, fig. 1.

Similar letters of reference indicate like parts.

My invention has for its object to furnish an improved tool for cutting bolts, &c., simple in construction and effective in operation; and it consists in the manner in which the levers or handles are pivoted to each other and to the jaws, and in the manner in which the jaws are pivoted and secured to each other.

A and B are the levers or handles, to the forward ends of which the jaws C and D are pivoted in such a way that they may both be in the same plane. This is done by inserting the ends of said jaws in slots formed in the body of the ends of the levers, or formed by attaching plates $a^1$ and $b^1$ to the sides of said ends. This latter construction I prefer, as being simpler. The levers A B, and jaws C D, are secured to each other by bolts or rivets, as shown, which said bolts or rivets form their pivoting points. Upon the inner edges of the ends of the levers A B are formed projections, arms, or elbows, which are pivoted to each other by a bolt or rivet, as shown in figs. 1 and 3. $a^2$ and $b^2$ are projections or stops, formed upon the inner edges of the levers A and B, which, by coming together, prevent the cutting edges of the jaws C and D from cutting upon each other, and being in that way injured. C and D are the jaws, upon the inner edges of the forward ends of which are formed the cutting edges of the tool. The jaws C and D are pivoted to each other by means of the straps or plates E and F, through which, and through the jaws C and D, are passed bolts or rivets, as shown in figs. 1 and 3, which said bolts or rivets form the pivoting points of said jaws. The jaws C and D are kept in their proper relative positions while operating by a tongue, $c^1$, formed upon the inner edge of one of the said jaws, and entering and working in a notch formed in the edge of the other jaw. This coupling is formed between the plates E and F, and in a line with the pivoting points of the jaws C and D.

By separating the free ends or handles of the levers A and B, the point at which they are pivoted to each other is thrown back, bringing their ends, or the points at which the jaws C and D are pivoted to them, nearer to each other. This draws the rear ends of the jaws C and D towards each other, opening their forward ends, upon which the cutting edges have been formed, for the reception of the bolt or other article to be cut. By bringing the ends or handles of the levers A and B towards each other, these movements are all reversed, the said levers acting upon the said jaws with the power and in the manner of a toggle-joint. If desired, one of the jaws, as C, may be bolted to a bench or other suitable support. In this case the rear end or handle of the lower lever, as A, may be cut off, and the jaws be operated by the remaining lever.

What I claim as new, and desire to secure by Letters Patent, is—

1. I claim securing the curved and abutting handles A and B one to the other by means of the plate $a$ and $a^1$, and $b$ and $b^1$, riveted to said handles, and the pivot or journal Z, all as herein set forth.

2. Pivoting the jaws C and D to each other by means of the tongue $c^1$ and straps or plates E and F, substantially as herein shown and described, and for the purpose set forth.

HOMER M. HANDY.

Witnesses:
　THOS. J. PARK,
　SAMUEL S. SHUBERT.